Figure 1:
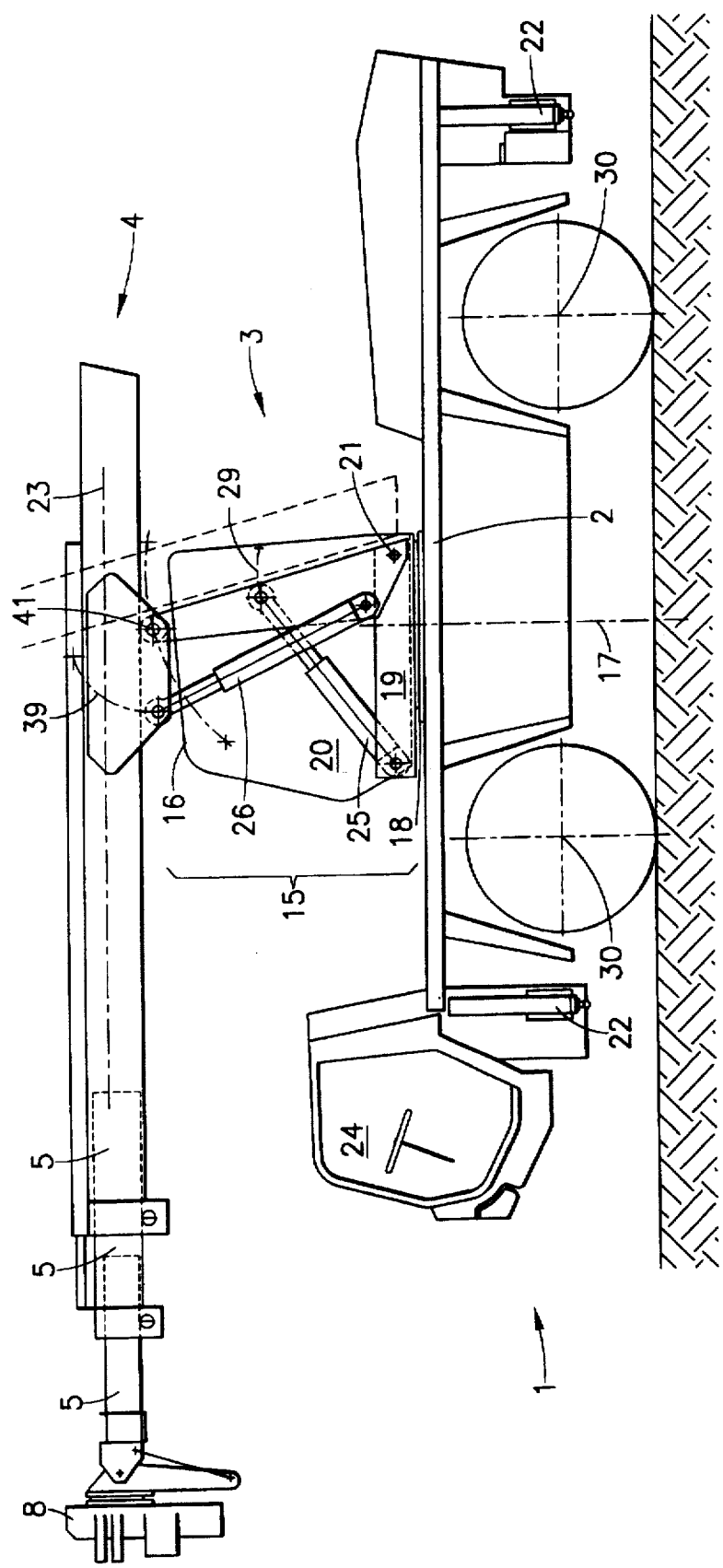

United States Patent [19]

Baumgartner

[11] Patent Number: 5,746,262
[45] Date of Patent: May 5, 1998

[54] BRANCH REMOVER

[75] Inventor: Hans Baumgartner, Nürensdorf, Switzerland

[73] Assignee: Doll Fahrzeugbau GmbH, Oppenau, Germany

[21] Appl. No.: 232,260

[22] PCT Filed: Sep. 18, 1992

[86] PCT No.: PCT/EP92/02162

§ 371 Date: Mar. 8, 1995

§ 102(e) Date: Mar. 8, 1995

[87] PCT Pub. No.: WO94/06275

PCT Pub. Date: Mar. 31, 1994

[51] Int. Cl.[6] ........................................ B27L 1/00
[52] U.S. Cl. .................... 144/24.13; 144/4.1; 144/343
[58] Field of Search .................... 144/2.2, 30, 335, 144/336, 338, 343, 24.13, 34.1

[56] References Cited

U.S. PATENT DOCUMENTS

| | | | |
|---|---|---|---|
| 3,443,617 | 5/1969 | Jorgensen | 144/22 |
| 3,531,235 | 9/1970 | Boyd et al. | 144/3 D |
| 3,720,246 | 3/1973 | David . | |
| 3,833,034 | 9/1974 | Menzel et al. | 144/3 D |
| 4,440,202 | 4/1984 | Everett | 144/2 Z |
| 4,532,757 | 8/1985 | Tutle . | |
| 4,583,908 | 4/1986 | Crawford | 144/3 D |
| 4,690,187 | 9/1987 | Schmidt | 144/2 Z |
| 4,919,175 | 4/1990 | Samson | 144/343 |

FOREIGN PATENT DOCUMENTS 0494319   7/1992   European Pat. Off. .
2106758  10/1972   Germany .

*Primary Examiner*—W. Donald Bray
*Assistant Examiner*—Gene L. Kim
*Attorney, Agent, or Firm*—Morgan & Finnegan, L.L.P.

[57] ABSTRACT

The invention relates to a self-propelling branch remover with the aid of which relatively large branches on trees, but even whole trees, can be gripped and capped.

For this purpose, either so-called felling saws have previously been used, which were attached to the front end of a hydraulic crane and gripped the trunk with claws and sawed it off using a pivotable capping saw. The other solution was that of a worker who was lifted in a lifting basket up to the relevant place and carried out the work there manually using a saw. In both cases, the sawn-off parts dropped down in an uncontrolled manner since even the felling saws did indeed hold the piece tight, but could not hold it in the original position since they could not be used to transmit a torque to the crane arm. The attachment was effected by means of two universal joints.

In the present case, this is prevented in that a connection between the felling saw unit and the machine frame is selected, which can absorb both bending forces and torques. For this purpose, the felling saw unit is attached so as to be rotatable and pivotable in a controlled manner relative to a torsion-resistant, jointless telescopic crane arm such that the entire work can be carried out by remote control from the driver's cab of the self-propelling branch remover. This avoids complex cordoning-off and safeguarding work.

23 Claims, 5 Drawing Sheets

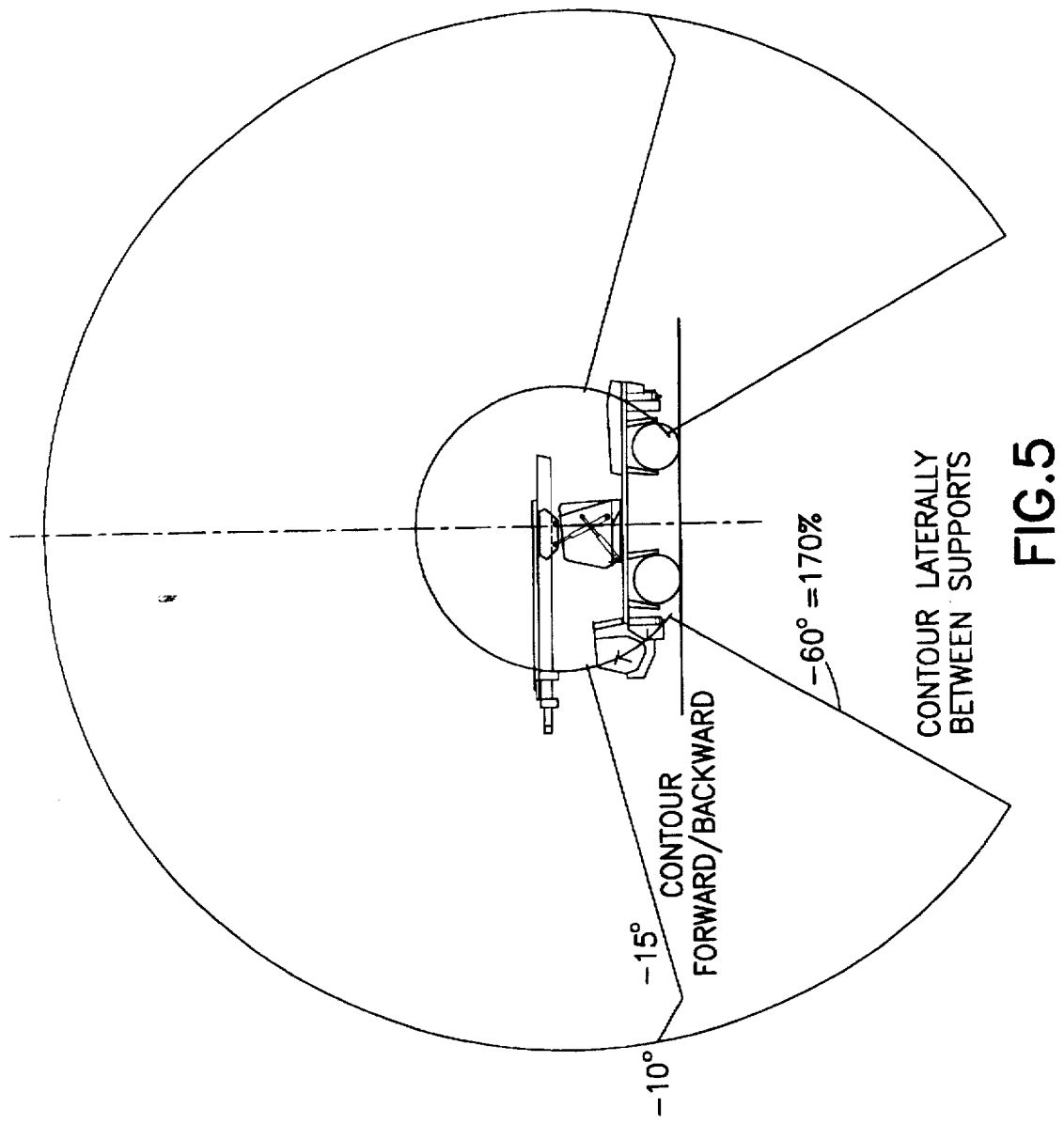

BRANCH REMOVER

DESCRIPTION

The invention relates to an assembly for the remote-controlled gripping, sawing-off and holding of branches and parts of trunks in this position. Such an operating machine is briefly called a "self-propelled branch remover" if it is situated on a self-propelled undercarriage, e.g. a truck undercarriage or a driven rail-bound undercarriage, instead of on a trailer, semi-trailer or railcar, although whole trees can, of course, also be accommodated by the assembly and sawn off just above the ground insofar as said trees do not exceed the dimensioning of the operating machine.

There has previously been the problem that, in branch removal work or felling work on avenue trees or other trees at highly frequented sites, a worker with a hand-guided saw is lifted up to the cutting point in a load basket located at the end of the jib of a crane and works there, or climbs directly up the trunk as a climber and caps the treetop.

However, the branches or parts of the trunk cut off then drop down in an uncontrollable manner and thus require wide-ranging cordoning-off of the workplace, which is both a hindrance to traffic and also requires great time expenditure and thus personnel costs. Additionally, there is the risk of injury for the helpers working on the ground and the risk of damage to the truck bearing the crane or the other machines. With this manner of working, the felling costs are calculated to be about DM 5,000 per tree.

For felling work in forest areas, it is known to use so-called felling grippers which consist mainly of a two-part claw and a capping saw, usually a sword-shaped chainsaw, arranged with spacing parallel to said claw. After the branch or trunk to be removed has been gripped by the claw gripper, it is cut off by pivoting the capping saw, but is still held by the claw gripper.

This working unit, the so-called felling gripper, is usually located at the free end of a bendable, but not telescopic jib of a hydraulic crane and hangs down from its free end, connected via one or two universal joints.

In this case, it is impossible to move the working unit by means of forces from the machines into a position in which the claws of the claw gripper are disposed approximately horizontally in order to grip around a vertical trunk or approximately vertical branch. This is achieved in that, on the side of the claw gripper facing away from the capping saw between two catch struts protruding obliquely from the claw gripper, a transversely running holding edge is fitted with projecting catch spikes such that the working unit hanging down vertically is brought to rest on the trunk with these catch spikes and is lowered further, as a result of which, due to the high friction between the holding edge and the trunk, the working unit can be tilted out of the vertical plane to the extent that the claw gripper can grip the vertical trunk. However, it is not possible to transmit torques from the jib and thus the operating machine to the working unit.

This leads furthermore to the fact that, after the trunk has been capped, said trunk cannot be held in its previous position by the working unit and thus the operating machine, but falls over due to the force of gravity and can only then be lifted up by the working unit, which again hangs vertically, and transported away.

Consequently, the relatively uncontrolled dropping-down of capped branch parts and the falling-over of capped trunks thus cannot be avoided.

It is therefore the object of the present invention to provide a self-propelled branch remover which, despite a simple and easy-to-handle construction, can saw off and remove branches and trunks by remote control without the removed wood falling over or dropping down in an uncontrolled manner.

In a branch remover according to the generic type, this object is achieved by the defining features of claim 1. Advantageous embodiments are defined in the subclaims.

Owing to the fact that bending moments and torques can be transmitted from the working unit via the jib of the crane onto the chassis which can indeed be supported sufficiently firmly at its corner points, it is possible to hold the wood cut off in its original position initially and to set it down slowly and in a targeted manner.

The capacity to transmit bending moments and torques is present in a jib which consists of a plurality of telescopic segments—and in particular if this jib has no bending points, that is to say no joint within the jib—which segments run precisely one inside the other and have a polygonal cross section if the working unit is additionally attached to the free end of said jib in such a way that, at its connection to the jib, the capacity to transmit torques and bending moments is again guaranteed.

A particularly cost-effective and lightweight construction results when a rectangular tube is used for the segments of the jib.

In order to achieve as large a working range of the working unit as possible, that is to say, for example, also to reach points which lie lower than the ground below the chassis, the jib is pivotable relative to the crane pillar from its position at right angles thereto not only through approximately 90° upward, but also through approximately 10° to 15° downward.

In order to obtain a branch remover which is as low as possible in terms of the overall construction height and thus can be employed well, the crane pillar is kept very low and has a large diameter, above all at the base, in order to guarantee a good transmission of force.

In this case, the driver's cab of the truck should likewise be of low design and end with its upper edge below the upper end face of the crane pillar in order to allow the working unit to reach down to points obliquely in front of the driver's cab in a position of the jib pivoted obliquely downward from the horizontal plane.

In order to facilitate the said work on embankments, relative to the chassis the crane pillar itself is, additionally, not only fully rotatable about a vertical axis, but also tiltable by a limited angle about a horizontal axis. Together with the pivotability of the jib relative to the crane pillar, this results in a working space which extends from the base of the operating machine not only hemispherically upward, but furthermore downward to a slope of about 60° below the horizontal plane.

Moreover, backward tilting of the upper part of the crane tower is thus possible, as a result of which the overall height including the telescopic arm located above it is lower for moving the vehicle.

The required transmission of bending moments and torques is achieved specifically by the fact that a toothed sleeving ring, which is known per se and is dimensioned to be as large as possible to correspond to the diameter of the base of the crane pillar, is located between the chassis and the lower part of the crane pillar. The upper part of the crane pillar is tiltable relative to said lower part about a horizontal tilting axis, the forces required for this purpose being generated by means of the known hydraulic cylinders.

With the aid of similar hydraulic cylinders, adapted accordingly in their dimensions, pivoting of the jib from the perpendicular rest position relative to the axis of rotation of the crane pillar is possible, its pivoting range from the rest position being approximately 90° upward and approximately 15° downward. The downward deviation is sufficient to be able to grip directly over the upper edge of the driver's cab.

The transmission of force from the jib, that is to say the free end of its foremost segment, to the working unit takes place by means of the attachment of an intermediate piece to the front end face at the free end of the jib which can likewise be pivoted by means of hydraulic cylinders about a pivot axis lying transversely to the longitudinal axis of the jib. In this case, the pivot axis lies horizontally in order to be able to bring the claws of the working unit hanging vertically in the rest position into a horizontal position.

In relation to this intermediate piece, the working unit is freely rotatable by means of a customary toothed sleeving ring whose axis of symmetry again lies transversely to the pivot axis and thus in the rest position parallel to the longitudinal axis of the jib. In order to keep the overall assembly as small as possible, the diameter of this toothed sleeving ring is restricted approximately to the transverse extent of the jib. In total, this results nevertheless in a transmission possibility for a torque of about 2 to 3, possibly even several, mt, whereas the transmittable bending moment depends on the dimensioning of the segments of the jib.

In a three-part jib whose overall length in the pushed-together state is less than 4.50 m and with an overall construction height on the chassis in the state of rest, that is to say with the jib lying horizontally, of less than 2 m, this results in a radius of action of the branch remover up to approximately 18 m in height and approximately 15 m in circumference, the jib being able to reach regions located in front of the driver's cab and behind the rear end of the truck up to an inclination of about 15° below the horizontal plane, while the working unit can reach embankments next to the truck up to an inclination of 60° below the horizontal plane. Together with a preferably four-wheel drive chassis of low construction, this results in accessibility above all in urban areas, which fulfills virtually all requirements.

Additionally, a branch remover of this type will preferably carry a chopper along with it in order to process the capped wood directly on site into wood chips, which additionally facilitates transporting it away. A chopper of this type can be transported at the rear of the self-propelled branch remover and can be set down from there by means of the claw gripper of the working unit prior to commencement of the work at a favorable point in the surroundings if the chopper has an appropriate attachment possibility for this purpose, for example a fixedly mounted, readily grippable transverse strut for the claw gripper. Furthermore, the chopper must be adapted accordingly, for transportation on the chassis, to its shaping, dimensioning and attachment possibilities, which depends on the selection of the chassis used.

In this case, the working unit is preferably supplied with working energy hydraulically and driven electrically. In this case, an electrically driven, multiple proportional hydraulic valve block is arranged at the front end of the jib, that is to say on the working unit 8 or the intermediate piece 10, for example. This has the advantage that only a feed line and a return line have to be laid along the jib to the valve block arranged at the free end from the hydraulic pump which is usually arranged at a favorable place on the chassis, whereas, in the previous working units, a separate feed line and return line had to be laid along the jib in each case for the individual functions. This solution reduces the weight and the susceptibility to breakdown since the risk of damage is less with only two lines than with a multiplicity of lines.

These feed and return lines for the hydraulic medium are adapted in their length in the case of changes of length of the jib via a spring-loaded, loose retraction roll by automatic winding and unwinding.

In order to save having a separate hydraulic pump for the working unit, the energy supply for the working unit can be connected to a hydraulic system of the undercarriage which may be present and can be switched on or off there by means of reversing switches.

In a self-propelling branch remover on a truck chassis, moving the truck and actuating the supports of the truck can also be carried out from the same cabin from which the working unit is controlled during the work.

Additionally, it is possible to arrange position sensors in the chassis of the truck, which, from a particular oblique position of the undercarriage at which there is a risk of the undercarriage tilting, bring about opening of the gripper of the working unit in order to avoid the undercarriage tilting. Such a circuit should, of course, only be carried out if sufficient safety measures, such as wide-ranging cordoning off, etc., are possible and have been carried out.

As an alternative to this solution described, the intermediate piece can also be connected to the free end of the jib via a toothed ring which is driven by means of a hydraulic motor. The rest of the working unit is then attached only relative to this rotatable intermediate piece via a pivot axis lying substantially horizontally and can be pivoted relative to said intermediate piece by means of a correspondingly arranged hydraulic cylinder.

In this case, the entire working unit can be removed very easily due to the fact that the intermediate piece is not fixedly connected to the free end of the jib, but is connected releasably to the free end of the jib via conical fitting pins and a screw connection. By releasing the screw connections, the entire working unit, including the complete toothed ring, can be removed.

In this case, the hydraulic supply of the drive motor for the toothed ring preferably takes place via hydraulic hoses which extend through the interior of the hollow intermediate piece and without hydraulic ring guides or similar components which are problematic in terms of their importance being necessary. This is possible since the range of rotation of the toothed ring is generally intended to be smaller than 180°.

Furthermore, the capping shears on the working unit consist of two substantially identical, movable arms with exchangeable blades. In this case, the blades are of hemispherical design and are screwed to the arms of the shears along their circumference.

In order to avoid rotation of the branch or trunk already gripped in the gripper, it has proved to be expedient for the gripping surfaces of the working unit to be fitted with a toothing directed toward the contact surface of the gripper material. The toothing is located, on the one hand, on the inner surfaces of the gripper arms and, on the other hand, on the fixed contact surfaces of the working unit. In this case, the toothing can be removed at least from the fixed parts of the working unit, designed in the form of a toothed strip shaped to correspond to the contour of the contact surfaces, which toothed strip is screwed laterally onto the working unit so that the toothing projects beyond the gripping surfaces. As a result, this toothing which becomes worn relatively quickly can quickly be renewed and also readjusted relative to the product gripped.

Furthermore, it has proved to be advantageous to equip the working unit with a camera, for example a video camera which passes on its signals to a monitor within the range of view of the operating personnel. As a result, the operator can assess the work situation from his workplace, from the perspective of the working unit. In this case, the video camera is to be attached, in a sufficiently protected manner, preferably directly to the working unit and can be pivoted in a controlled manner in order also to record image regions immediately adjacent to the direct working area.

An embodiment according to the invention is described in greater detail below by way of example.

Figure 2:
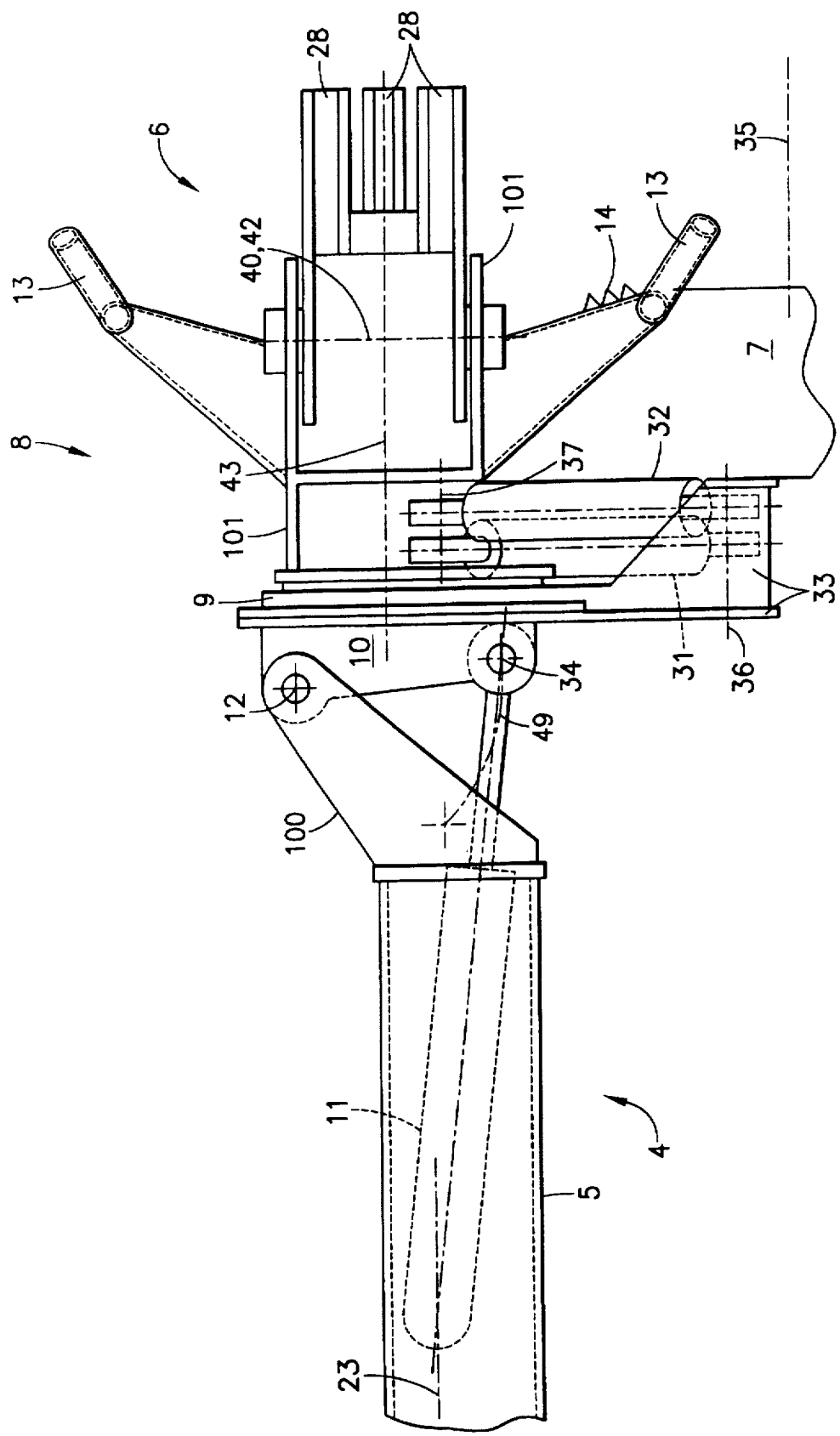
Figure 3:
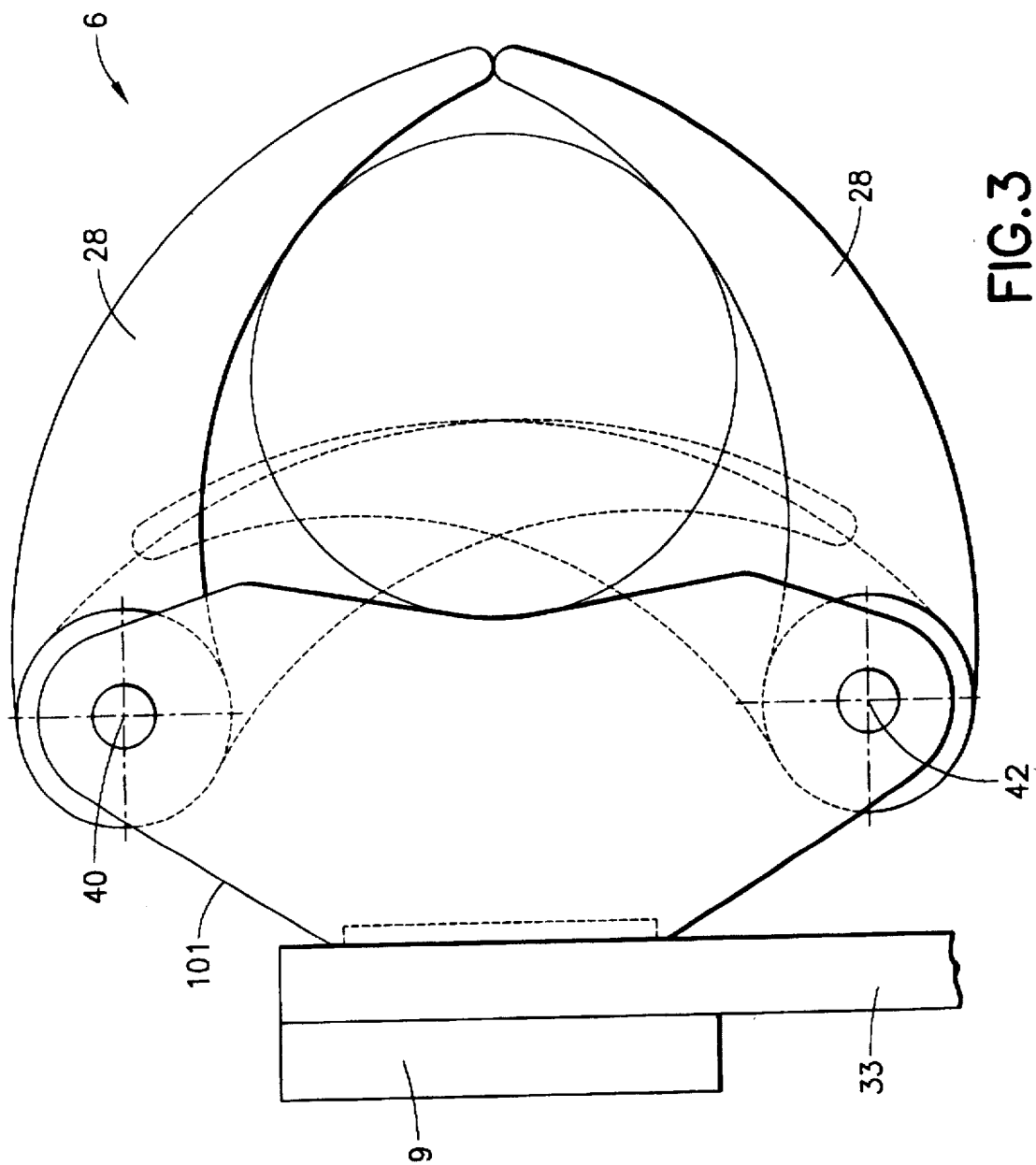
Figure 4:
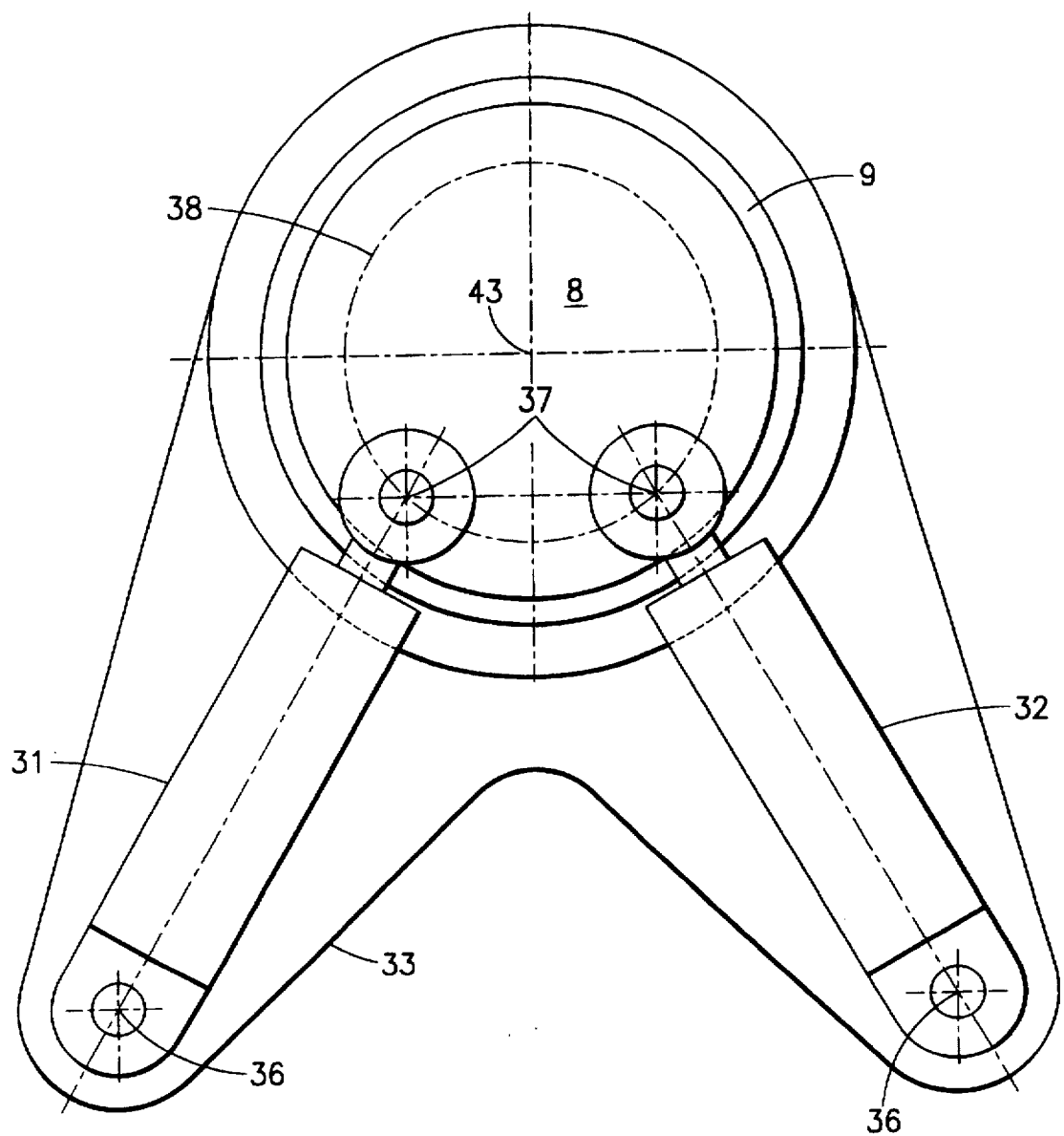

FIG. 1 shows a lateral illustration of the overall branch remover,

FIG. 2 shows a detailed view of the working unit attached to the free end of the jib, FIG. 3 shows a view according to FIG. 2 in the transverse direction, FIG. 4 shows a section through the working unit 8 perpendicular to its longitudinal axis 43, and FIG. 5 shows a diagrammatic illustration of the working space of the branch remover which can be reached by the working unit 8.

In the figures, the hydraulic supply of the working unit and the valve block and its electric control leads at the front end of the jib are not included in the rawing for reasons of simplicity. FIG. 1 shows a side view of the branch remover, but without the working unit on the jib of the crane.

The truck undercarriage 1 can be seen, whose chassis 2 can be firmly supported on the ground by means of the hydraulic chassis supports 22. The crane pillar 15 is set up approximately in the middle of the chassis 2, that is to say between the axles 30. In this case, the lower part 19 of the crane pillar 15 is attached by means of the toothed sleeving ring 18 so as to be rotatable about a vertical axis 17 relative to the chassis 2. The upper part 20 of the crane pillar 15 is set up on the lower part 19 and attached so as to be tiltable relative thereto about the horizontal tilting axis 21 which runs transversely to the vehicle at the rear end of the crane pillar. The tilting movement of the upper part 20 relative to the lower part 19 is brought about by means of a hydraulic cylinder 25 which is linked, on the one hand, to the lower part 19 near to the front edge thereof and, on the other hand, to the upper part 20. The upper linkage point of the hydraulic cylinder 25 on the upper part 20 thus moves along the curved line 29 whose center-point is the tilting axis 21.

The pivoting of the jib 4 relative to the upper part 20 of the crane pillar 15 functions in the same manner.

In the state of rest, the jib 4 lies approximately horizontally above the upper end face 16 of the crane pillar 15 and protrudes to the greatest extent toward the front, but also toward the rear beyond the crane pillar.

A second hydraulic cylinder 26 is linked by its one end in the lower rear region to the upper part 20 of the crane pillar 15, and by its other end to a point on the jib 4 located further forward in the state of rest.

By extending or retracting the piston of the hydraulic cylinder 26, the linkage point of the hydraulic cylinder 26 on the jib 4 moves on a curved line 39 whose center is the approximately horizontal tilting axis 41 which, when the upper part 20 is tilted, moves on a curved line concentric to the curved line 29.

The dashed line shows the jib 4 in its completely upright position relative to the upper part 20 of the crane pillar.

Furthermore, the three segments 5 of the jib 4 can be distinguished at the left end of the jib 4, which segments each consist of rectangular tubes which fit inside one another and can be extended telescopically.

It can furthermore be seen in FIG. 1 that the driver's cab 24 is of very low construction, such that its upper edge ends below the upper end face 16 of the crane pillar 15. As a result, the jib disposed along the longitudinal axis of the vehicle can also be lowered from the horizontal plane downward to just above the driver's cab 24, such that points on the base lying in front of the driver's cab 24 can also be reached.

FIG. 2 shows—likewise in a side view—an enlarged illustration of the working unit 8 attached to the front end of the foremost segment 5 of the jib 4. Said working unit consists of the claw gripper 6 and the capping saw 7 (not illustrated in detail) and the connecting parts to the jib 4.

Arranged fixedly on the free end face of the rectangular tube of the segment 5 is a cantilever plate 100 which extends forward and laterally beyond the area of the segment 5. An intermediate piece 10 is attached to said cantilever plate 100 so as to be rotatable about a pivot axis 12 running approximately horizontally.

Whereas the pivot axis 12 is located in the upper region of the intermediate piece 10 and above the cross section of the segment 5, the linkage point 34 for the hydraulic cylinder 11 or its piston is located in its lower region, the other end of the hydraulic unit being attached to the segment 5. The linkage point 34 can thus move along a curved line 49, as a result of which the claws 28 of the claw gripper 6 disposed horizontally in FIG. 2 can be moved into a vertical position.

The holding plate 33, which additionally has regions protruding at angles, is mounted rigidly on the intermediate piece 10. In the horizontal position of the working unit 8 illustrated in FIG. 2, the holding plate 33 preferably extends vertically downward from the longitudinal axis 43 of the working unit 8, as can also be seen in FIG. 4.

Located on the side of the holding plate 33 facing away from the jib 4 is the toothed sleeving ring 9 by means of which it is possible to rotate the working unit 8 relative to the intermediate piece 10 and the holding plate 33 about the longitudinal axis 43 of the working unit which, in the position illustrated in FIG. 2, lies approximately parallel to the longitudinal axis 23 of the jib 4. The working unit 8 consists of the claw gripper 6 which comprises three claws 28 and of the capping saw 7 which is illustrated in FIG. 2 only with its surrounding housing. The pivoting plane of the capping saw 7 is included in the drawing as a dot-dashed line 35.

Furthermore, the working unit 8 comprises the catch struts 13 which protrude obliquely from the longitudinal axis 43 and between which the holding edge 27 extends, which is covered with catch spikes 14 as indicated. With this holding edge, the working unit presses against the tree or branch to be capped, the catch spikes 14 pressed into the wood preventing it from slipping out. Between the working unit 8 and the holding plate 33, which is V-shaped in the plan view of FIG. 4 and is firmly connected to the intermediate plate 10, two hydraulic cylinders 31 and 32 are linked in each case by one end to the working unit 8 and by the other end to the holding plate 33. In this case, the two hydraulic units protrude radially at an acute angle approximately toward the longitudinal axis 43 of the working unit 8. Their outer linkage points 36 are located at the free ends of the V-shaped holding plate 33, whereas their linkage points 37 lying on the inside are located on the working unit 8, such that the extension and retraction of the interacting hydraulic cylinders 31, 32 results in a rotation of the working unit 8 relative to the holding plate 33 by means of the toothed sleeving ring 9 which is known per se, the linkage points 37 lying on the inside lying on a circular path 38 concentric to the longitudinal axis 43. As a result, a rotary movement of the working unit relative to the holding plate 33 by about ±105° is possible.

FIG. 3 shows furthermore a view of the claw gripper 6 of FIG. 2 rotated through 90°.

In FIG. 2, only two of the total of three crescent-shaped claws 28 are visible since, in this view, the uppermost and the lowermost of the three claws from FIG. 2 lie in congruence. In this case, the claws are pivotable about two axes 40, 42 which are attached between the two housing plates 101 arranged in parallel. These housing plates 101 are attached to the holding plate 33 which is seated on the toothed sleeving ring 9.

The trunk indicated in FIG. 3 is held between the claws 28 and the housing plates 101.

This results in the movement possibilities illustrated in FIG. 5 for the working unit 8 of the branch remover attached to the jib 4: from the horizontal plane upward, this is a hemispherical area which can be reached. Toward the front and the rear beyond the driver's cab 24 or the rear end of the chassis, the jib 4 can be lowered down to an angle of −15° below the horizontal plane. Laterally next to the chassis, specifically between the supports 22 of the chassis, the jib 4 can assume a downward inclination deviating from the horizontal plane by up to −60° by pivoting relative to the crane pillar 15 and its oblique position relative to the chassis 2, such that even points on steep embankments obliquely below the truck can be reached. The magnitude of this absolute working space depends on the dimensions of the jib. In a three-part jib which in the pushed-together state measures about 5.5 m from its pivot point, this results in a radius of the working range of more than 15 m.

This results in the advantages mentioned that the work can be carried out with a smaller number of and less-qualified personnel, fewer vehicles are required in total and the overall time expenditure and thus also the overall costs incurred are lower. Additionally, safety during such work is increased.

Depending on the design of the undercarriage, in addition to a driver's cab which may be present, a separate cabin may be present for the undercarriage on or in the crane pillar, from which the working unit is controlled by an operator during use.

I claim:

1. A branch remover comprising:
   (a) an undercarriage having a chassis and a driver's cab positioned at a front end of said undercarriage;
   (b) a crane pillar having a lower part and an upper part, wherein a base end of said crane pillar lower part is rotatably coupled to said undercarriage chassis;
   (c) a jib comprising a jointless telescopic arm having a plurality of segments slidably coupled one inside another and capable of transmitting a torque of at least one meter-ton (mt) from a jib free end to a jib base end, wherein said jib is pivotally coupled to said crane pillar upper part;
   (d) a working unit having a holding edge, a claw gripper, and a capping device, wherein said capping device is pivotally movable parallel to said claw gripper and said working unit is pivotally and rotatably coupled to said jib free end;
   (e) coupling means between said working unit and said jib free end capable of transmitting a torque of at least one meter-ton (mt) from said working unit to said jib free end;
   (f) coupling means between said jib and said pillar upper part capable of transmitting a torque of at least one meter-ton (mt) from said jib to said crane pillar upper part;
   (g) coupling means between said pillar upper part and said pillar lower part capable of transmitting a torque of at least one meter-ton (mt) from said crane pillar upper part to said crane pillar lower part; and
   (h) coupling means between said crane pillar lower part to said undercarriage chassis capable of transmitting a torque of at least one meter-ton (mt) from said crane pillar lower part to said undercarriage chassis.

2. The branch remover according to claim 1, wherein said plurality of segments each have a common polygonal cross section.

3. The branch remover according to claim 2, wherein said plurality of segments each comprise a tube having a rectangular cross section, wherein the long axis of symmetry of said rectangular cross section is disposed approximately vertically to the horizontal plane of said undercarriage chassis when said jib is in a position approximately parallel to the horizontal plane of said undercarriage chassis.

4. The branch remover according to claim 1, wherein said jib is pivotally coupled to said crane pillar upper part such that said jib is pivotable relative to the horizontal plane of said undercarriage chassis by at least 15° downward and by at least 80° upward.

5. The branch remover according to claim 1, wherein said crane pillar lower part is rotatable relative to said undercarriage chassis by at least ±180° and said crane pillar upper part is tiltable relative to the horizontal plane of said undercarriage chassis by at least ±10°.

6. The branch remover according to claim 5, wherein said base end of said crane pillar lower part is rotatably coupled to said undercarriage chassis by means of a toothed sleeving ring and said crane pillar upper part is tiltable relative to the horizontal plane of said undercarriage chassis by means of a hydraulic cylinder.

7. The branch remover according to claim 1, wherein said coupling means between said working unit and said jib free end comprises an intermediate piece wherein said intermediate piece is pivotally coupled to said jib free end about an approximately horizontal pivot axis lying transversely to the longitudinal axis of said jib by means of a hydraulic cylinder and is rotatably coupled to said working unit by means of a small toothed sleeving ring positioned about an axis transverse to said horizontal pivot axis and approximately parallel to the longitudinal axis of said jib.

8. The branch remover according to claim 7, wherein said small toothed sleeving ring is rotated using a hydraulic motor wherein a hydraulic medium is supplied to said hydraulic motor by means of a plurality of hoses extending from said jib free end.

9. The branch remover according to claim 7, wherein said working unit is coupled to the small toothed sleeving ring by a plurality of conical fitting pins and screws.

10. The branch remover according to claim 1, wherein said crane pillar is configured to have a diameter of preferably more than 1 meter at said base end of said crane pillar lower part and a height of preferably less than 1.5 meter from said base end of said crane pillar lower part to an upper surface of said crane pillar upper part.

11. The branch remover according to claim 1, wherein said capping device comprises a pair of capping shears which are pivotally movable parallel to said claw gripper and which have two symmetrical movable arms.

12. The branch remover according to claim 11, wherein each of said symmetrical movable arms has an exchangeable, hemispherical blade which is coupled to said symmetrical movable arm along its circumference.

13. The branch remover according to claim 1, wherein said holding edge and said claw gripper have a plurality of toothings directed toward the contact surfaces of the product to be gripped to prevent such product from slipping.

14. The branch remover according to claim 13, wherein said plurality of toothings are exchangeable.

15. The branch remover according to claim 1, wherein said working unit further comprises a plurality of flush grippers and a drilling unit to permit drilling holes in the ground for placing and erecting masts.

16. The branch remover according to claim 1, wherein the longitudinal axis of said jib is approximately parallel above the horizontal plane of said upper surface of said crane pillar upper part when said jib is in a resting position and said jib free end and said jib base end extend beyond opposing ends of said crane pillar.

17. The branch remover according to claim 1, wherein a top surface of said undercarriage driver's cab is positioned below the horizontal plane of said upper surface of said crane pillar upper part and wherein said undercarriage driver's cab is of very sturdy design.

18. The branch remover according to claim 1, wherein said working unit further comprises a video camera which can be controlled in its direction of view.

19. The branch remover according to claim 1, wherein said undercarriage comprises a self-propelled truck undercarriage.

20. The branch remover according to claim 1, wherein said undercarriage comprises a railway undercarriage.

21. The branch remover according to claim 1, wherein said coupling means between said working unit and said jib free end comprises an intermediate piece wherein said intermediate piece is pivotally coupled to said working unit about an approximately horizontal pivot axis lying transversely to the longitudinal axis of said jib by means of a hydraulic cylinder and is rotatably coupled to said jib free end by means of a small toothed sleeving ring positioned about an axis transverse to said horizontal pivot axis and approximately parallel to the longitudinal axis of said jib.

22. The branch remover according to claim 21, wherein said small toothed sleeving ring is rotated using a hydraulic motor wherein a hydraulic medium is supplied to said hydraulic motor by means of a plurality of hoses extending from said jib free end.

23. The branch remover according to claim 21, wherein said jib free end is coupled to the small toothed sleeving ring by a plurality of conical fitting pins and screws.

* * * * *